United States Patent
Mushiake et al.

[11] Patent Number: 6,005,655
[45] Date of Patent: Dec. 21, 1999

[54] PROJECTOR CAPABLE OF PROJECTING POLARIZED ILLUMINATION LIGHT

[75] Inventors: Nobuo Mushiake, Osaka; Yasumasa Sawai, Sakai, both of Japan

[73] Assignee: Minolta Co., Ltd., Osaka, Japan

[21] Appl. No.: 08/959,311

[22] Filed: Oct. 28, 1997

[30] Foreign Application Priority Data

| Oct. 31, 1996 | [JP] | Japan | 8-290846 |
| Oct. 31, 1996 | [JP] | Japan | 8-290875 |
| May 15, 1997 | [JP] | Japan | 9-125634 |

[51] Int. Cl.$^6$ .................................................. G03B 21/00
[52] U.S. Cl. .......................................................... 355/31
[58] Field of Search ............................. 353/30, 31, 34, 353/37, 81, 20; 359/40

[56] References Cited

U.S. PATENT DOCUMENTS

| 5,172,254 | 12/1992 | Atarashi et al. | 359/41 |
| 5,387,953 | 2/1995 | Minoura et al. | 353/20 |
| 5,446,510 | 8/1995 | Mitsutake et al. | 353/20 |
| 5,626,409 | 5/1997 | Nakayama et al. | 353/31 |
| 5,743,611 | 4/1998 | Yamaguchi et al. | 353/31 |

FOREIGN PATENT DOCUMENTS

| 4-078816 | 3/1992 | Japan . |
| 4-139416 | 5/1992 | Japan . |
| 5-313120 | 11/1993 | Japan . |

*Primary Examiner*—Eddie C. Lee
*Assistant Examiner*—Hung Henry Nguyen
*Attorney, Agent, or Firm*—Sidley & Austin

[57] ABSTRACT

A projector is provided with a first lens array, a polarized beam splitter for splitting a beam of light into beams of linearly polarized light components whose polarization axes are normal to each other, a second lens array in vicinity of a position where the beams of linearly polarized light components converge, and a converter for converting one of the linearly polarized light components so as to have the same axes of polarization as the other linearly polarized light components. The polarized beam splitter includes a prism having the following relationship:

$$\Psi - \sin^{-1}\left(\frac{\sin\left(\tan^{-1}\left(\frac{\sqrt{W^2 + H^2}}{2F}\right)\right)}{N}\right) - \sin^{-1}\left(\frac{1}{N}\right) \geq 0$$

wherein $\psi$ denotes an angle of incidence with respect to the parallel plate, W denotes a width of the first lens, H denotes a height of the first lens, F denotes a focal length of the first lens, and N denotes a refractive index of the prism.

9 Claims, 6 Drawing Sheets

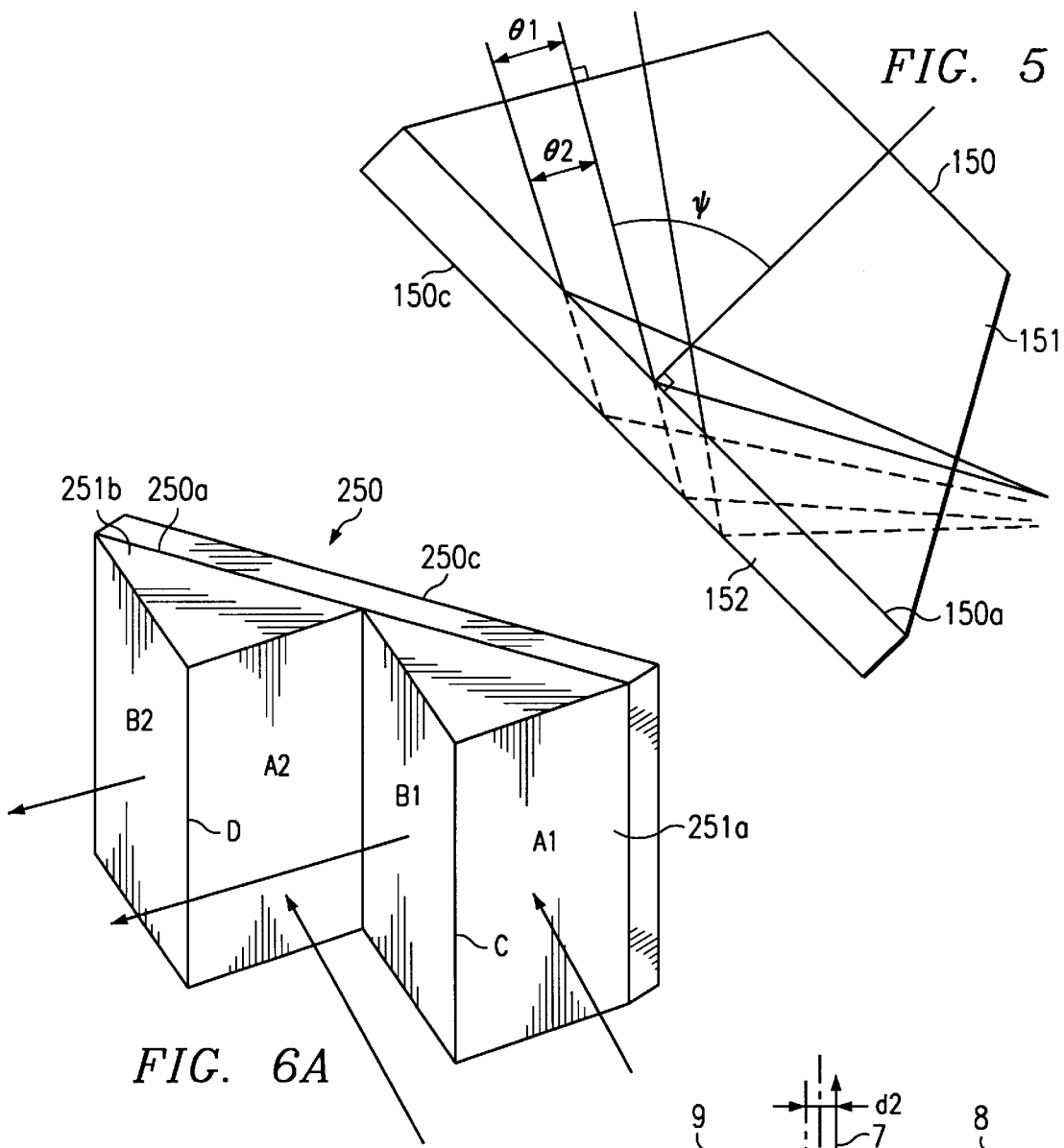
FIG. 5
FIG. 6A
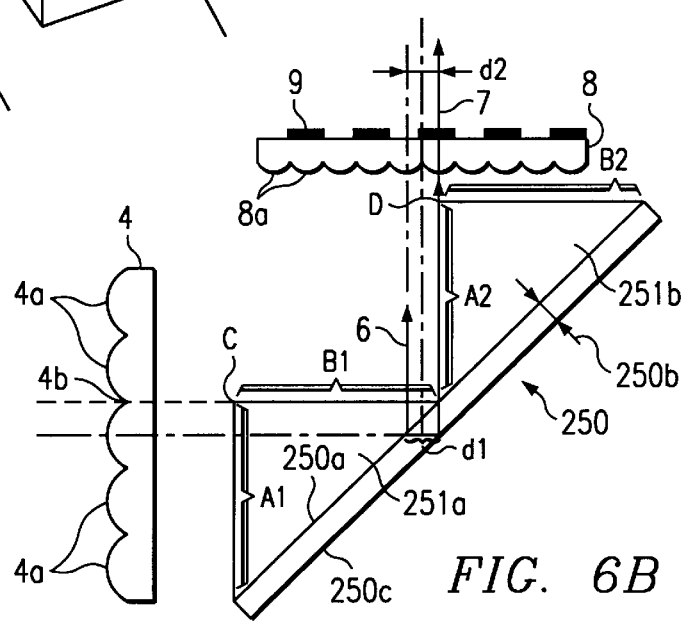
FIG. 6B

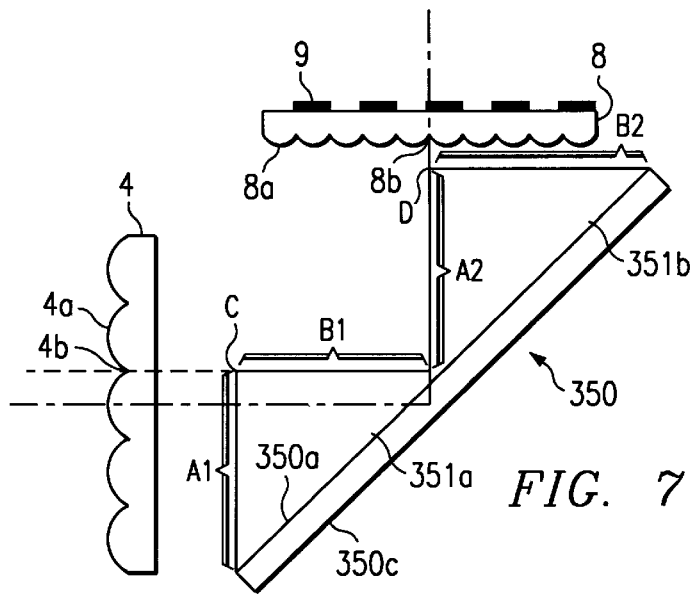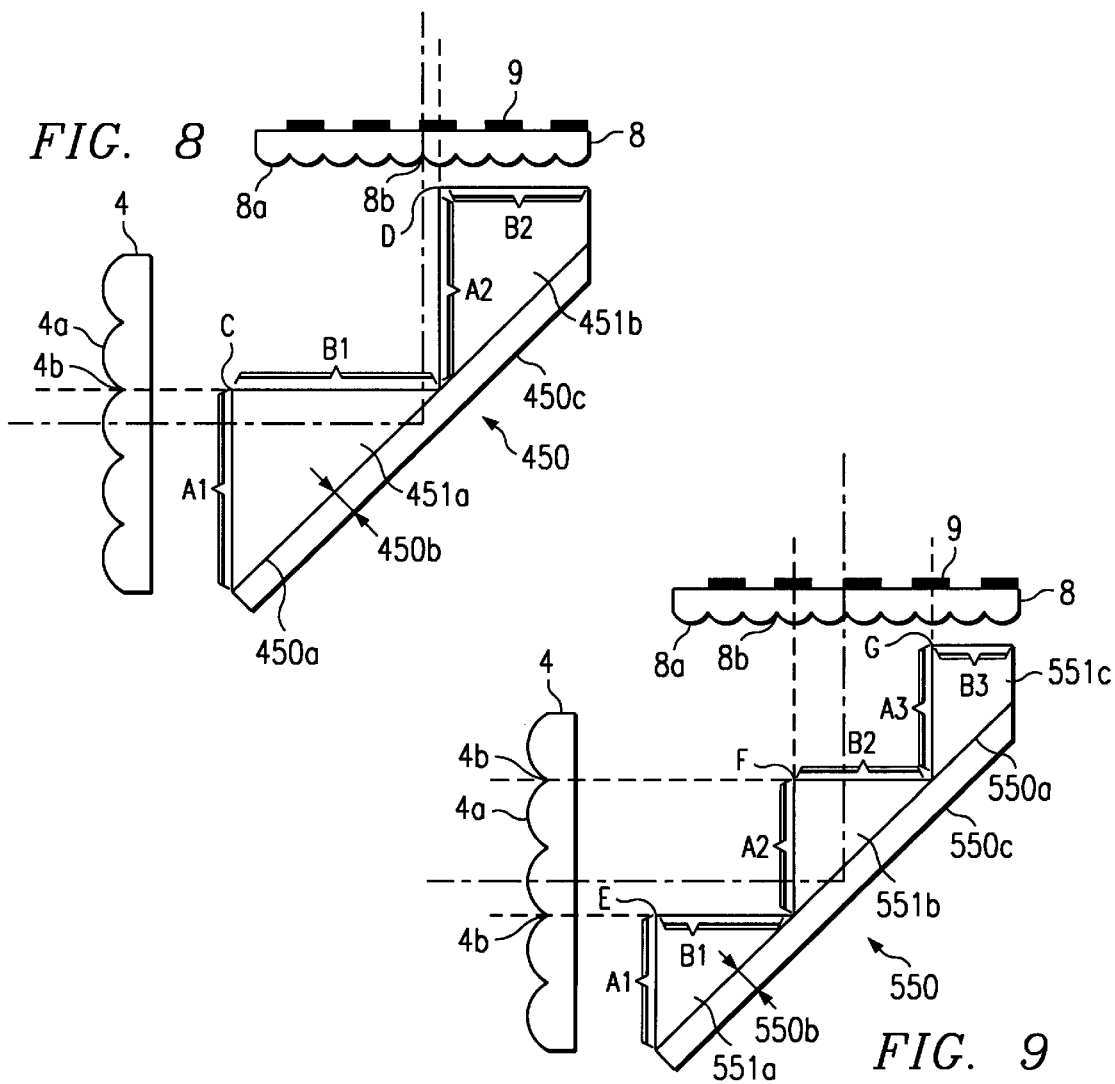

PROJECTOR CAPABLE OF PROJECTING POLARIZED ILLUMINATION LIGHT

BACKGROUND OF THE INVENTION

This invention relates to a projector for projecting an optical image on a screen.

A projector is known as a means for projecting an optical image formed in accordance with a video signal on an image panel, e.g., a liquid crystal panel, with illumination light and projecting the optical image projected by the illumination light on a screen via a projection lens.

FIG. 11 shows an illuminating optical system used in a known projector. A randomly polarized light irradiated from a light source 101 as well as a light reflected by a reflection surface 102a of a parabolic mirror 102 which is a partial surface including a pole of a paraboloid of revolution have light components in an unnecessary wavelength area removed by an IR-UV filter 103. The light having the light components in the unnecessary wavelength area is separated into a plurality of beams by a first lens array 104.

A plurality of beams split by the first lens array 104 are split by a polarized beam splitter 105 into beams 106 of first linearly polarized light components and beams 107 of second linearly polarized light components, the axes of polarization of the first and second linearly polarized light components being normal to each other.

On an emergence surface of a second lens array 108 where light sources formed by the beams 107 of the second linearly polarized light components, among light sources formed on the second lens array 108 by the first lens array 104, half-wave plates 109 are mounted to convert the axes of polarization of the second linearly polarized light components of the beams 107 into those of the first linearly polarized light components, thereby aligning the axes of polarization of all small light sources.

Thus, if the linearly polarized illumination light issued from the illuminating optical system is projected on an optical image on the liquid crystal panel formed in accordance with a video signal and the optical image illuminated by the illumination light is enlargedly projected onto the screen, a large image can be displayed.

However, such a projector needs to improve the reflectivity of the beams 107 in order to ensure a highly efficient utilization of light. Accordingly, coating of silver (Ag), aluminum (Al), or the like needs to be applied to the reflection surface 105b. This is one of factors hindering the reduction of operation steps in manufacturing the projector.

Further, the right angle prism of the polarized beam splitter 105 weighs about 700 g. This is one of factors hindering the projector from being made more lightweight.

SUMMARY OF THE INVENTION

It is an object of the present invention to provide a projector which has overcome the problems residing in the prior art.

It is another object of the present invention to provide a projector which can be produced at reduced costs and can also have a lower weight without degrading the quality of an image projected on a screen.

According to an aspect of the present invention, a projector comprises a first lens array including a plurality of first lenses arranged two-dimensionally for separating light into a plurality of beams of light; a polarized beam splitter for splitting a beam of light into a beam of first linearly polarized light components and another beam of second linearly polarized light components, polarization axes of the first and second linearly polarized light components being normal to each other, the polarized beam splitter including a prism having an incidence surface perpendicularly intersecting an optic axis of the first lens array on which a beam of light is incident; a first splitting surface obliquely intersecting the optic axis of the first lens array, the first splitting surface reflecting the first linearly polarized light components; a transparent parallel plate attached on the first splitting surface, the angle of incidence $\psi$ with respect to the parallel plate, the width W of the first lens, the height H of the first lens, the focal length F of the first lens, and the refractive index N of the prism satisfying the following equation:

$$\Psi - \sin^{-1}\left(\frac{\sin\left(\tan^{-1}\left(\frac{\sqrt{W^2 + H^2}}{2F}\right)\right)}{N}\right) - \sin^{-1}\left(\frac{1}{N}\right) \geq 0$$

and a second lens array including a plurality of second lenses arranged two-dimensionally in vicinity of a position where the beams of the first and second linearly polarized light components converge; and a converter for converting one of the first and second linearly polarized light components so as to have the same axes of polarization as the other linearly polarized light components.

According to another aspect of the present invention, a projector comprises a first lens array including a plurality of first lenses arranged two-dimensionally for separating light into a plurality of beams of light; a polarized beam splitter for splitting a beam of light into a beam of first linearly polarized light components and another beam of second linearly polarized light components, polarization axes of the first and second linearly polarized light components being normal to each other, the polarized beam splitter including a plurality of prisms whose respective splitting surfaces are on an oblique plane obliquely intersecting an optic axis of the first lens array, an emergence surface of at least one of the plurality of prisms being positionable on a plane passing a boundary between first lenses of the first lens array; a second lens array including a plurality of second lenses arranged two-dimensionally in vicinity of a position where the beams of the first and second linearly polarized light components converge; and a converter for converting one of the first and second linearly polarized light components so as to have the same axes of polarization as the other linearly polarized light components.

These and other objects, features and advantages of the present invention will become more apparent upon a reading of the following detailed description and accompanying drawings.

BRIEF DESCRIPTION OF THE DRAWINGS

FIG. 5 is a diagram of a prism with an angle of incidence on a polarized beam splitting surface of ψ;

FIG. 6A is a perspective view of a polarized beam splitter for a second embodiment of the present invention;

FIG. 6B is a plan view showing a first embodiment of the polarized beam splitter, the first lens array, and the second lens array, of FIG. 6A;

FIG. 7 is a diagram of a second embodiment of the polarized beam splitter, the first lens array, and the second lens array, of FIG. 6A;

FIG. 8 is a diagram of a third embodiment of the polarized beam splitter, the first lens array, and the second lens array, of FIG. 6A;

FIG. 9 is a diagram of a fourth embodiment of the polarized beam splitter, the first lens array, and the second lens array, of FIG. 6A;

DETAILED DESCRIPTION OF THE PREFERRED EMBODIMENTS OF THE INVENTION

Figure 1:
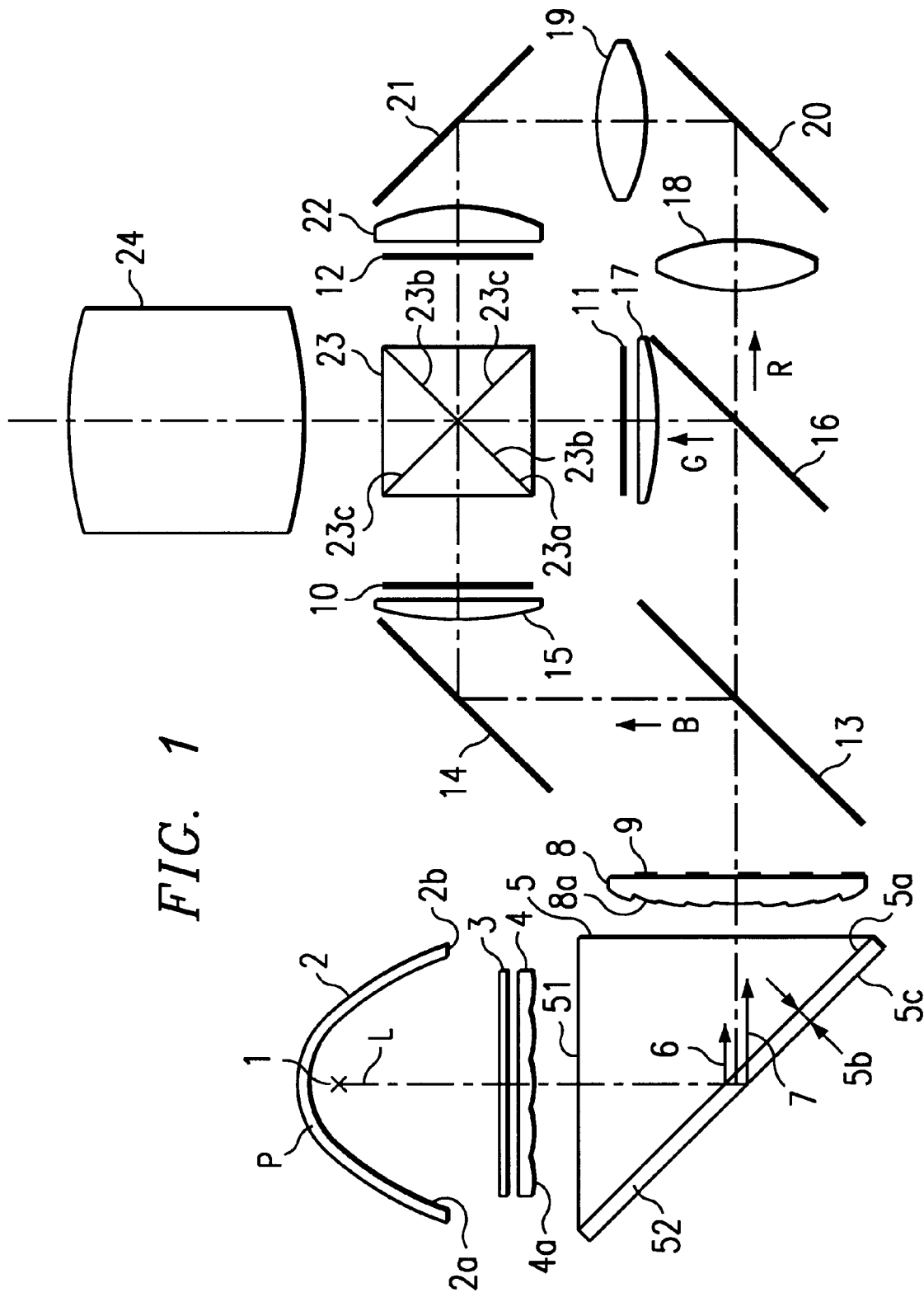
FIG. 1 is a diagram of an embodiment of a projector of the present invention.

Referring to FIG. 1 showing a first projector embodying the present invention, a light source 1 is a metal halide lamp for irradiating a randomly polarized white light. A parabolic mirror 2 has a reflection surface 2a which is a partial surface including a pole of a paraboloid of revolution and has a cross section which is symmetrical with respect to a line. The parabolic mirror 2 is adapted to reflect a light irradiated from a focus (the light source 1 is located at this focus position) to the outside (downward in FIG. 1) of an opening 2b. An IR-UV filter 3 is arranged in the vicinity of the opening 2b and is adapted to remove light components within wavelength regions unnecessary for lights of three primary colors from the direct light from the light source 1 and the light reflected by the reflection surface 2a.

A first lens array 4 constituting an optical integrator includes a plurality of two-dimensionally arranged first lenses 4a on which the direct light from the light source 1 and the light reflected by the reflection surface 2a of the parabolic mirror 2 are incident and from which these lights emerge after being separated into a plurality of beams of light. The first lenses 4a have identically shaped apertures. The first lens array 4 is located in the vicinity of an output side of the IR-UV filter 3 so as to be as close as possible maximally close to the parabolic mirror 2.

A polarized beam splitter 5 is a splitter of a polarized light converting optical system having a right angle prism 51 which is a triangular prism of transparent glass and a transparent planar parallel plate 52. The right angle prism 51 has an incidence surface and an emergence surface which are perpendicular to an optic axis L and a rear surface which is an oblique surface, and is arranged such that a line normal to this rear surface is at about 45° to the optic axis of the first lens array 4. A plurality of beams separated by the first lens array 4 are split into beams 6 of first linearly polarized light components and beams 7 of second linearly polarized light components using the right angle prism 51 and the planar parallel plate 52. The polarization axes of the first and second linearly polarized light components are normal to each other.

Specifically, a polarized beam splitting surface 5a is formed on the rear surface of the right angle prism 51 which is an oblique surface. The first linearly polarized light components of the light emerging from the first lens array 4 are reflected by the polarized beam splitting surface 5a at 90° after having been incident thereon at 45°, and emerges therefrom as the beams 6.

Figure 2A:
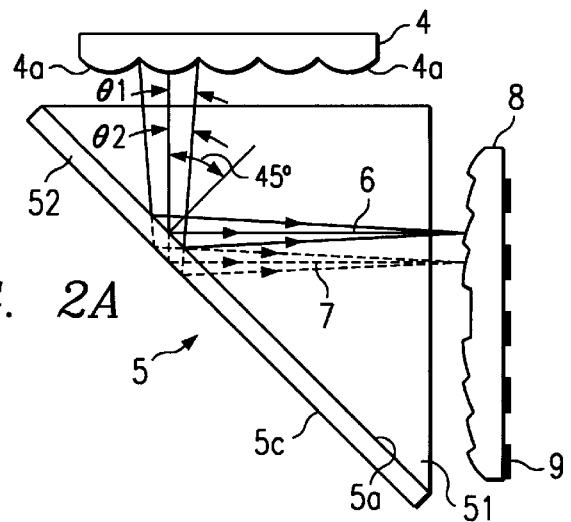
FIG. 2A is a diagram of an arrangement of the polarized beam splitter, the first lens array, and the second lens array, of FIG. 1.
Figure 2B:
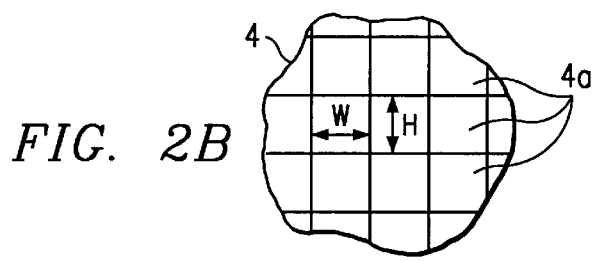
FIG. 2B is a partial plan view of the first lens array of FIG. 2A when viewed from an emergence side.

FIG. 2A shows an arrangement of a polarized beam splitter, a first lens array, and a second lens array. FIG. 2B is a partial plan view of the first lens array 4 when viewed from an emergence side. In FIG. 2A, the use of the first lens array 4 constituting the optical integrator causes an incidence angle of the light having been incident on the polarized beam splitter 5 on the polarized beam splitting surface 5a and a reflection surface 5c to vary in a range of ±θ1 with respect to 45°. Assuming that F, W, H denote a focal length, a width and a height of each first lens 4a, respectively, θ1 in the air is given by the following Equation (1).

$$\theta 1 = \tan^{-1}\left(\frac{\sqrt{W^2 + H^2}}{2F}\right) \quad (1)$$

Further, in FIG. 2A, if the right angle prism 51 is made of a material having a refractive index N, the transparent planar parallel plate 52 having a specified thickness which is arranged on the rear surface of the polarized beam splitting surface 5a is made of a material having the same refractive index N in this embodiment. In this case, the materials for the right angle prism 51 and the planar parallel plate 52 may be the same or different provided the refractive indices thereof are the same. It should be noted that the refractive index of the planar parallel plate 52 is not necessarily the same as that of the right angle prism 51. Cases where these refractive indices are different are described later.

In the case that the refractive indices of the right angle prism 51 and the plane parallel plate 52 are the same, the angle θ1 becomes the angle θ2 of the following Equation (2) in the polarized beam splitter 5 of in the right angle prism 51 or in the plane parallel plate 52.

$$\theta 2 = \sin^{-1}\left(\frac{\sin(\theta 1)}{N}\right) \quad (2)$$

At this time, in order to substantially fully reflect the beams 7 by the rear surface (5c) of the plane parallel plate 52, i.e., to have this rear surface function substantially as a full reflection surface, the following condition or Equation (3) needs to be satisfied.

$$45 - \theta 2 \geq \sin^{-1}(1/N) \quad (3)$$

Accordingly, if W, H, F and N are determined so as to satisfy Equation (4) which is derived from Equations (1), (2) and (3), the rear surface (reflection surface 5c) of the planar parallel plate 52 functions substantially as a full reflection surface even if this rear surface is not coated with Ag, Al or the like:

$$45 - \sin^{-1}\left(\frac{\sin\left(\tan^{-1}\left(\frac{\sqrt{W^2 + H^2}}{2F}\right)\right)}{N}\right) - \sin^{-1}\left(\frac{1}{N}\right) \geq 0 \quad (4)$$

It is more preferable that the refractive indices of the right angle prism 51 and the planar parallel plate 52 be the same and particularly be made of the same material, because there is no difference in the thermal expansion coefficient between these members and even under a high temperature condition, the polarized beam splitting function can thus be maintained. This allows the use of light sources which generates a high temperature, increasing a degree of freedom in selecting a light source, and also the selection and use of a brighter light source. In addition, such a polarized beam splatter is durable against a continuous use over a long time.

Figure 3:
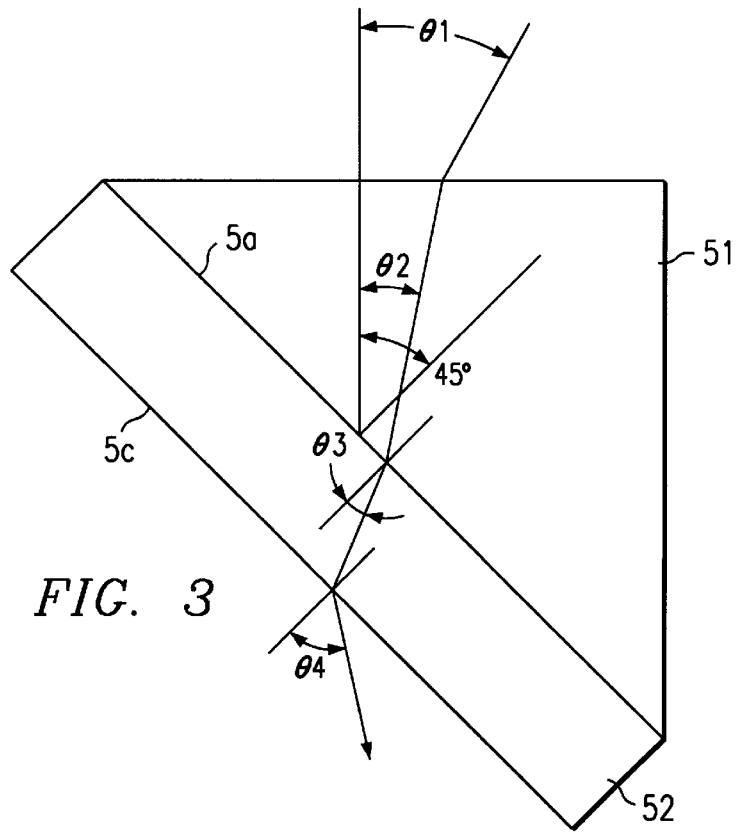
FIG. 3 is a diagram of an assembly of a right angle prism and a planar parallel plate having different refractive indices in which the rear surface of the planar parallel plate substantially functions as a full-reflection surface.

Next, a case where the refractive indices of the right angle prism 51 and the plane parallel plate 52 are different is described. FIG. 3 is a diagram of an assembly. of a right angle prism and a plane parallel plate having different refractive indices in which the rear surface of the planar parallel plate substantially functions as a full-reflection surface. It should be noted that the refractive index of the right angle prism 51 is N as in the above example and that of the planar parallel plate 52 is N'. At this time, in FIG. 3, the relationship between the angles θ1 and θ2 is the same as that of FIG. 2A, but a relationship between the angle θ2 and an angle θ3 within the planar parallel plate 52 is given by Equation (5) by Snell's Laws of Refraction:

$$N \times \sin(45 - \theta 2) = N' \times \sin(\theta 3) \quad (5)$$

Further, a relationship between the angle θ3 and an angle of emergence θ4 at the rear surface of the planar parallel plate 52 is given by Equation (6) by Snell's Law of Refraction:

$$N' \times \sin(\theta 3) = \sin(\theta 4) \quad (6)$$

Further, a relationship between the angles θ2 and θ4 obtained from Equations (5), (6) is given by Equation (7).

$$\sin(\theta 4) = N \times \sin(45 - \theta 2) \quad (7)$$

In order for the rear surface (reflection surface 5c) of the planar parallel plate 52 to function substantially as a full reflection surface, a condition of Equation (8) needs to be satisfied:

$$\sin(\theta 4) \geq 1 \quad (8)$$

Equation (9) is obtained by transforming Equations (7) and (8):

$$45 - \theta 2 = \sin^{-1}\left(\frac{1}{N}\right) \quad (9)$$

Accordingly, the conditional expression or Equation (9) for causing the rear surface (reflection surface 5c) of the planar parallel plate 52 to function substantially as a full reflection surface is the same as Equation (3). This means that the condition that angle θ2 should satisfy is the same as the one when the right angle prism 51 and the planar parallel plate 52 have the same refractive index. In other words, Equation (4) is derived as a conditional expression for causing the rear surface (reflection surface 5c) of the planar parallel plate 52 to function substantially as a full reflection surface even in the case when the right angle prism 51 and the plane parallel plate 52 have different refractive indices.

Figure 4:
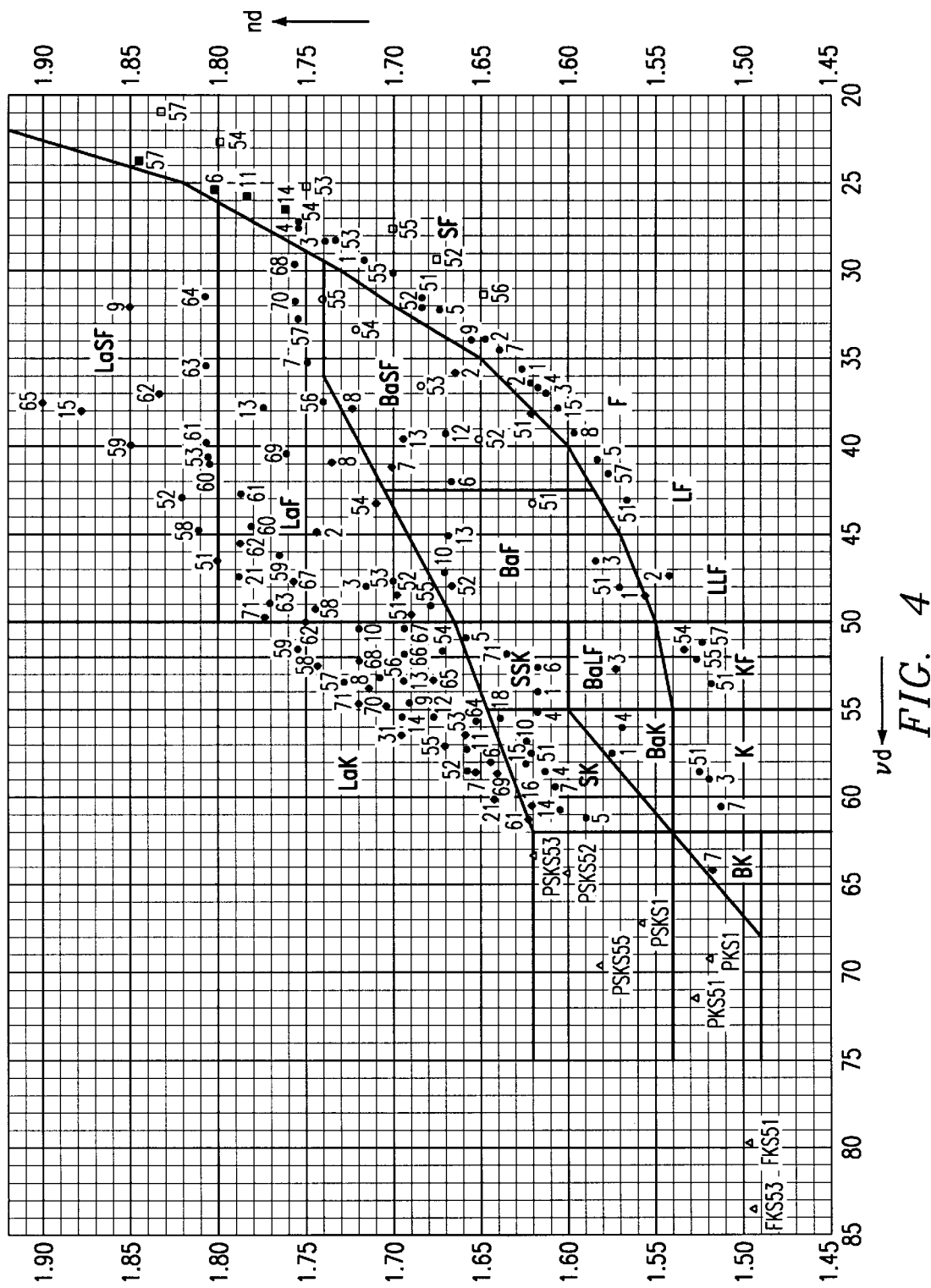
FIG. 4 is a graph of refractive indices of respective glass materials.

The polarized beam splitter 5 used in this embodiment is constructed by the right angle prism 51 and the planar parallel plate 52 which have the same refractive index. Here, let it be assumed that W=14 mm, H=11 mm and F=60 mm. If N is calculated in accordance with equation (4), N≧1.56787. The refractive indices of the respective glass materials are shown in the graph of FIG. 4. The vertical axis represents the refractive index (larger to and the horizontal axis represents dispersion (larger to the right). According to this graph, glass materials which satisfy the above condition for N include BaK1. If such a glass material is used for the right angle prism 51 and the planar parallel plate 52 of the polarized beam splitter 5, it is not necessary to apply coating of Ag, Al or the like to the reflection surface 5c.

Referring back to FIG. 1, the reflection surface 5c is spaced away from the polarized beam splitting surface 5a by a thickness 5b. The second linearly polarized light components, which are normal to the first linearly polarized light components of the light coming from the first lens array 4 are reflected at 90° by the reflection surface 5c after having been incident thereon at 45°, and emerge as the beams 7. The thickness 5b is set based on the intervals between the beams 6 and 7 (2½ times the thickness 5b) and the intervals of the second lenses 8a.

A second lens array 8 constituting the optical integrator includes the second lenses 8a which are arranged in a two-dimensional manner in the vicinity of a position where the plurality of beams 6, 7 split by the polarized beam splitter 5 converge and are as many as the plurality of beams 6 and the plurality of beams 7. Specifically, the second lenses 8a of the second lens array 8 are twice as many as the first lenses 4a of the first lens array 4, and two second lenses 8a adjacent to each other along vertical direction of FIG. 1 correspond to one first lens 4a. On a portion of the emergence surface of the second lens array 8 where the beams 7 emerge, there are mounted half-wave plates 9 for converting the second linearly polarized light components of the beams 7 so as to have the same axes of polarization as the first linearly polarized light components of the beams 6. The half-wave plate 9 is a converting portion of the polarized beam converting optical system and constructs the polarized beam converting optical system together with the aforementioned polarized beam splitter 5.

The liquid crystal panels 10 to 12 are of a transmission type for forming optical images of B, G and R, respectively.

Two dichroic mirrors 13, 16 construct a color separating optical system for separating light into beams of three primary colors in order to illuminate the three liquid crystal panels 10 to 12 with the corresponding primary color beams. The dichroic mirror 13 has a cutoff value of wavelength 510 nm so as to reflect the beams in the wavelength region of B (blue) and cause the beams in the wavelength regions of R (red) and G (green) to pass. A full-reflection mirror 14 directs the separated beams in the wavelength region of B toward the liquid crystal panel 10. A field lens 15 projects the beams in the wavelength region of B reflected by the full-reflection mirror 14 onto the liquid crystal panel 10. The dichroic mirror 16 has a cutoff value of wavelength 585 nm so as to reflect the beams in the wavelength region of G among those in the wavelength region of R and G which have passed the dichroic mirror 13 and to cause the beams in the wavelength region of R to pass. The field lens 17 projects the beams in the wavelength region of G separated by the dichroic mirror 16 onto the liquid crystal panel 11. Lenses 18, 19 and full-reflection mirrors 20, 21 construct a relay optical system for introducing the beams in the wavelength region of R which have passed the dichroic mirror 16 to the liquid crystal panel 12 while keeping the illuminance thereof. A field lens 22 projects the beams in the wavelength region of R which have been introduced by the relay optical system onto the liquid crystal panel 12.

The dichroic prism 23 is a three primary color combining optical system for combining the aforementioned optical images of R, G and B. The dichroic prism 23 in the form of a cube or rectangular parallelepiped includes four right-angle prisms 23*a* joined with each other. In the joined portions of the prisms 23*a* are formed a first dichroic mirror portion 23*b* for reflecting the optical image of B at 90° which has been incident thereon at 45° and causing the optical images of R and G to pass, and a second dichroic mirror portion 23*c* for reflecting the optical image of R at 90° which has been incident thereon at 45° and causing the optical images of G and B to pass.

A projection lens 24 is a projecting optical system for enlargedly projecting a color optical image combined by the dichroic prism 23 on a screen (not shown).

The randomly polarized beams irradiated from the light source 1 together with the light reflected by the reflection surface 2*a* of the parabolic mirror 2 have light components in a wavelength area unnecessary which are for the three wavelength regions of R, G and B and are removed by the IR-UV filter 3. The light having light components removed in the unnecessary wavelength area are separated into a plurality of beams by the first lens array 4.

The respective beams separated by the first lens array 4 are split by the polarized beam splitter 5 into beams 6 of first linearly polarized light components and beams 7 of second linearly polarized light components, the axes of polarization of the beams 6 and 7 being normal to each other. Specifically, the beams emerging from the emergence surface of the first lens array 4 are propagated straight into the polarized beam splitter 5 as incident light. The first linearly polarized light components of the incident light are reflected at 90° by the polarized beam splitting surface 5*a* after having been incident thereon at about 45°, and emerge as the beams 6. Further, the incident light of the second linearly polarized light components which is propagated straight further along an optic path produced by the thickness 5*b* without being reflected by the polarized beam splitting surface 5*a* is reflected at 90° by the full-reflection surface 5*c* after having been incident thereon at about 45°, and emerge as the beams 7.

A plurality of beams 6 and a plurality of beams 7 form as many small light sources as the number of beams separated by the first lens array 4 in the vicinity of the second lens array 8 by the focusing action of the first lens array 4. The half-wave plates 9 are mounted on the emergence surfaces of the second lens 8*a* where the small light sources formed by the beams 7 among those formed on the second lens array 8 are located. Thus, the axis of polarization of the second linearly polarized light components of the beams 7 is converted into that of the first linearly polarized light components of the beams 6, thereby aligning the axes of polarization of all small light sources.

The beams having their axes of polarization aligned and emerging from the second lens array 8 mounted with the half-wave plates are separated into beams in wavelength regions of R, G and B by the dichroic mirrors 13, 16. Specifically, the beams in the wavelength region of B separated by the dichroic mirror 13 illuminate the liquid crystal panel 10 after being reflected by the full-reflection mirror 14 and passing the field lens 15. The beams in the wavelength regions of R and G pass the dichroic mirror 13. Then, the beams in the wavelength region of G illuminate the liquid crystal panel 11 after being reflected by the dichroic mirror 16 and passing the field lens 17. The beams in the wavelength region of R pass the field lens 22 after passing the dichroic mirror 16 and introduced to the relay optical system including the two lenses 18, 19 and the two full-reflection mirrors 20, 21, and consequently illuminate the liquid crystal panel 12. Here, since a distance between the liquid crystal panel 12 and the second lens array 8 is different from a distance between the second lens array 8 and the liquid crystal panels 10, 11, the illuminated state of the liquid crystal panel 12 is made equal to those of the other liquid crystal panels 10, 11 by using the lenses 18, 19 of the relay optical system.

The optical images formed by the three liquid crystal panels 10 to 12 are combined by the dichroic prism 23. Specifically, the optical image of B formed by the liquid crystal panel 10 is propagated straight the dichroic prism 23 as incident light is reflected at 90° by the first dichroic mirror portion 23*b* after having been incident thereon at 45°, and emerges toward the projection lens 24. The optical image of R formed by the liquid crystal panel 12 also is propagated straight into the dichroic prism 23 as incident light, is reflected at 90° by the second dichroic mirror portion 23*c* after having been incident thereon at 45°, and emerges toward the projection lens 24. The optical image of G formed by the liquid crystal panel 11 is propagated straight all the way through the dichroic prism 23 as incident light without being reflected by the first and second dichroic mirror portions 23*b*, 23*c*, and emerges toward the projection lens 24. In this way, the optical images formed by the three liquid crystal panel 10 to 12 are combined by being projected to the projection lens 24 located in the same direction while their axes of polarization coincide with the optic axis. The combined optical image is projected in an enlarged fashion on the screen.

Although the angle of incidence ψ on the polarized beam splitting surface 5*a* is 45° in this embodiment, the angle ψ should be changed according to the overall size of the polarized beam splitter 5 and the overall size of the system. For example, even if the angle ψ is not 45° as shown in FIG. 5, a conditional expression for causing the rear surface of a similar transparent planar parallel plate 152 to function substantially as a full reflection surface can be obtained. Specifically, by replacing 45° in Equation (4) by ψ, there can be obtained Equation (10) for causing the rear surface (reflection surface 150*c*) of the planar parallel plate 152 to function substantially as a full reflection surface:

$$\Psi - \sin^{-1}\left(\frac{\sin\left(\tan^{-1}\left(\frac{\sqrt{W^2 + H^2}}{2F}\right)\right)}{N}\right) - \sin^{-1}\left(\frac{1}{N}\right) \geq 0 \quad (10)$$

However, if ψ is set larger than 45°, a prism 151 has to be larger in order to make the incidence surface and the emergence surface thereof normal to the optic axis L as shown in FIG. 5. Conversely, if ψ is set smaller than 45°, the splitting performance of the polarized beam splitting surface 150*a* tends to decrease. Therefore, it is preferable to set a central angle of incidence ψ at or about 45°.

Although the half-wave plates 9 are arranged on all the portions of the emergence surface of the second lens array 8 where the beams 7 emerge in this embodiment, the half-wave plates 9 may be arranged on a part of the emergence surface of the second lens array 8 where the beams 7 emerge.

Further, although the half-wave plates 9 are mounted on the emergence surfaces of the second lenses 8*a* where the small light sources formed by the beams 7 are located in this embodiment, they may be mounted on the emergence surfaces of the second lenses 8*a* where the small light sources formed by the beams 6 are located. It is sufficient that the half-wave plates 9 be mounted on all or a part of the second lenses 8*a* where the small light sources formed by the beams 6 or 7 are located. If the half-wave plates 9 are mounted on the emergence surfaces of the second lenses 8a where the small light sources formed by the beams 7 are located, it is effective in correcting a difference in optical path between the beams 6 reflected by the polarized beam splitting surface 5a and the beams 7 passing the polarized beam splitting surface 5a. Thus, this mounting of the half-wave plates 9 is more preferable.

Furthermore, although a metal halide lamp is used as the light source 1 in this embodiment, a xenon lamp or halogen lamp may be used.

Next, a second embodiment of the present invention will be described. It should be noted that no description is given on the construction which is similar to that of the first embodiment and only a different construction is described.

FIG. 6A shows a polarized beam splitter for use in the second embodiment, and FIG. 6B shows a first arrangement of the polarized beam splitter, the first lens array, and the second lens array.

A polarized beam splitter 250 is a splitter of a polarized light converting optical system constructed by first and second right angle prisms 251a, 251b which are triangular prisms of transparent glass. The right angle prisms 251a, 251b are arranged such that their rear surfaces which are oblique surfaces are at 45° to the optic axis of the first lens array 4, and splits a plurality of beams separated by the first lens array 4 into beams 6 of first linearly polarized light components and beams 7 of second linearly polarized light components in different optical paths. The polarization axes of the first and second linearly polarized light components are normal to each other.

A polarized beam splitting surface 250a is formed on the rear surface of each of the first and second right angle prisms 251a, 251b. The first linearly polarized light components of the light emerging from the first lens array 4 are reflected at 90° by the polarized beam splitting surface 250a after having been incident thereon at 45°, and emerge as the beams 6.

A full reflection surface 250c is spaced opposite from the polarized beam splitting surface 250a by thickness 250b. The second linearly polarized light components normal to the first linearly polarized light components of the light coming from the first lens array 4 are reflected at 90° by the reflection surface 250c after having been incident thereon at 45°, and emerge as the beams 7. The thickness 250b is set based on the intervals between the beams 6 and 7 (2½ times the thickness 250b) and the intervals of the second lenses 8a.

In FIG. 6A, the incidence and emergence surfaces of the first and second right angle prisms 251a, 251b are surfaces A1, A2, B1, and B2, respectively. The right angle prisms 251a, 251b are substantially equivalent to a right angle prism from which a rectangular parallelepiped having the surfaces B1, A2 is taken away.

In FIG. 6B, the incidence surface A1 of the first right angle prism 251a faces a lower side of the emergence surface of the first lens array 4, and the incidence surface A2 of the second right angle prism 251b faces an upper side of the emergence surface of the first lens array 4. The first right angle prism 251a is arranged such that a plane including the emergence surface B1 crosses a boundary 4b between the first lenses 4a in the second and third rows. Accordingly, the plane including the emergence surface B1 does not cross the central portion of the first lens 4a, thereby preventing an image having an unfocused ridge C from being projected on a screen (not shown).

A plurality of beams separated by the first lens array 4 are split by the polarized beam splitter 250 into the beams 6 of first linearly polarized light components and the beams 7 of second linearly polarized light components whose polarization axes are perpendicular to each other. Specifically, the beams emerging from the emergence surface of the first lens array 4 are propagated straight into the polarized beam splitter 250 as incident light. At this time, since the emergence surface B1 of the first right angle prism 251a coincides with the boundary 4b of the first lenses 4a, an image having an unfocused ridge C is not projected on the screen. The first linearly polarized light components of the incident light propagated straight into the polarized beam splitter 250 are reflected at 90° by the polarized beam splitting surface 250a, and emerge therefrom as the beams 6. Further, the second linearly polarized light components propagated further straight along an optical path d1 created by the thickness 250b without being reflected by the polarized beam splitting surface 250a are reflected at 90° by the full reflection surface 250c after having been incident thereon at 45°, and emerge therefrom as the beams 7.

A plurality of beams 6 and a plurality of beams 7 form as many small light sources as a plurality of beams separated by the first lens array 4 in vicinity of the second lens array 8 by the focusing action of the first lens array 4. At this time, the small light sources formed by the beams 7 are focused while being displaced from the small light sources formed by the beams 6 by a lateral displacement d2 which is equal to a distance the beams 7 propagated straight along the optical path d1. The thickness 250b is set such that the lateral displacement d2 is equal to half the interval between the small light sources formed by the beams 6. As a result, in the vicinity of the second lens array 8, the small light sources by the beams 6 and the small light sources by the beams 7 alternately appear at intervals of the lateral displacement d2. Further, a total number of the small light sources is equal to a sum of the small light sources by the beams 6 and the small light sources by the beams 7. This total number is equal to twice the number of the beams separated by the first lens array 4. An area on the second lens array 8 taken up by the small light sources by the beams 6 and the beams 7 (hereinafter referred to as "secondary light sources") is substantially equal to an area on the second lens array 4 taken up by the small light sources by the beams 6. Due to high density, a limited space can be more effectively utilized.

By mounting the half-wave plates 9 on the emergence surfaces of the second lenses 8a where the small light sources formed by the beams 7 among the secondary light sources formed on the second lens array 8 are located, the polarization axes of the second linearly polarized light components of the beams 7 are converted into those of the first linearly polarized light components of the beams 6, with the result that the polarization axes of all small light sources can be aligned. Thus, the beams issued from all the small light sources as secondary light sources can be used to illuminate the respective three liquid crystal panel 10 to 12. Further, the first lenses 4a of the first lens array 4 and the three liquid crystal panel 10 to 12 are in an optically conjugated relationship. Since the respective beams separated by the first lens array 4 are superimposed on the liquid crystal panel 10 to 12, the liquid crystal panel 10 to 12 are illuminated at a uniform distribution of light.

In this embodiment, the polarized beam splitter 250 is constructed such that a plane including the incidence surface A2 of the second right angle prism 251b crosses the center of the second lens 8a located in the sixth row from the left as shown in FIG. 6B. However, this plane may not cross the center of the second lens 8a. FIG. 7 is a diagram showing a second embodiment of the polarized beam splitter of FIG.

6A. Specifically, in place of the polarized beam splitter 250, a polarized beam splitter 350 may be used which includes a first right angle prism 351a and a second right angle prism 351b. A plane including an emergence surface B1 of the first right angle prism 351a crosses a boundary 4b, and a plane including an incidence surface A2 crosses a boundary 8b located between the second lenses 8a in the fifth and sixth rows. It should be noted that 350a, 350c denote a polarized beam splitting surface and a full reflection surface, respectively.

In FIG. 7, the respective second lens 8a of the second lens array 8 are in a conjugated relationship with the light source 1 of FIG. 1. In projectors or the like, so-called Koehler illumination is generally adopted according to which a light source is arranged in a conjugated manner with the iris of a projection lens. In this case, the respective second lenses 8a of the second lens array 8 are in a conjugated relationship with the iris of the projection lens 24. Generally, in the projectors adopting the optical integrator, the nonuniform illuminance on the iris is considered not to influence the image on the screen. However, this holds true only when a luminance distribution within a solid angle viewing the liquid crystal panel from the iris is randomly nonuniform. In the case of nonuniformity having a common tendency, its influence is seen in the image on the screen. Accordingly, if the polarized beam splitter 350 is constructed such that the plane including the incidence surface A2 of the second right angle prism 351b crosses the boundary 8b located between the second lenses 8a in the fifth and sixth rows as shown in FIG. 7, the influence of nonuniformity can be prevented from being seen in the image on the screen.

FIG. 8 shows a third embodiment of a polarized beam splitter and other elements. A polarized beam splitter 450 is a splitter of a polarized light converting optical system which includes a first right angle prism 451a in the form of a triangular prism of transparent glass or the like, a second right angle prism 451b which has a partial configuration of a triangular prism of transparent glass or the like, a polarized beam splitting surface 450a which is formed on the oblique rear surfaces of the first and second right angle prisms 451a, 451b and a full reflection surface 450c which is spaced opposite to the polarized beam splitting surface 450a by thickness 450b.

This polarized beam splitter 450 is used in place of the polarized beam splitter 5 of FIG. 1. At this time, since a plane including an emergence surface B1 of the first right angle prism 451a crosses a boundary 4b, an image having an unfocused ridge C is not projected on the screen.

The second right angle prism 451b has a trapezoidal cross section because a part thereof is cut to make the prism 451b lightweight. It should be noted that, in the present invention, the triangular prism configuration includes such trapezoidal prisms obtained by cutting off a part from a triangular prism as the second right angle prism 451b.

Although the polarized beam splitter 450 is constructed such that the plane including the incidence surface A2 of the second right angle prism 451b crosses the center of the second lens 8a located in the sixth row from the left, this plane may not cross the center of the second lens 8a as in FIG. 7.

FIG. 9 shows a fourth embodiment of a polarized beam splitter and other elements. A polarized beam splitter 550 is a splitter of a polarized light converting optical system which includes first, second and third right angle prisms 551a, 551b, 551c in the form of a triangular prism of transparent glass or the like, a polarized beam splitting surface 550a which is formed on the oblique rear surfaces of these right angle prisms 551a to 551c and a full reflection surface 550c which is spaced opposite to the polarized beam splitting surface 550a by thickness 550b.

This polarized beam splitter 550 is used in place of the polarized beam splitter 5 of FIG. 1. At this time, since planes including emergence surfaces B1, B2 of the first and second right angle prisms 551a, 551b cross boundaries 4b, an image having unfocused ridges E and F is not projected on the screen.

Although the polarized beam splitter 550 is constructed such that planes including incidence surfaces A2, A3 of the second and third right angle prisms 551b, 551c cross the centers of the second lenses 8a, these planes may not cross the centers of the second lenses 8a as in FIG. 7.

Figure 10:
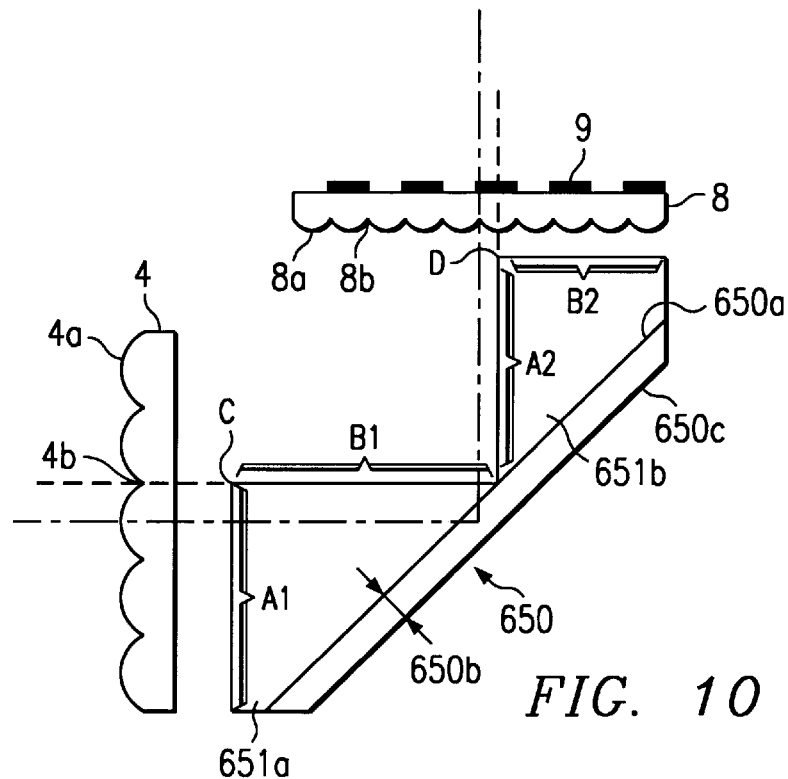
FIG. 10 is a diagram of a fifth embodiment of the polarized beam splitter, the first lens array, and the second lens array, of FIG. 6A.
Figure 11:
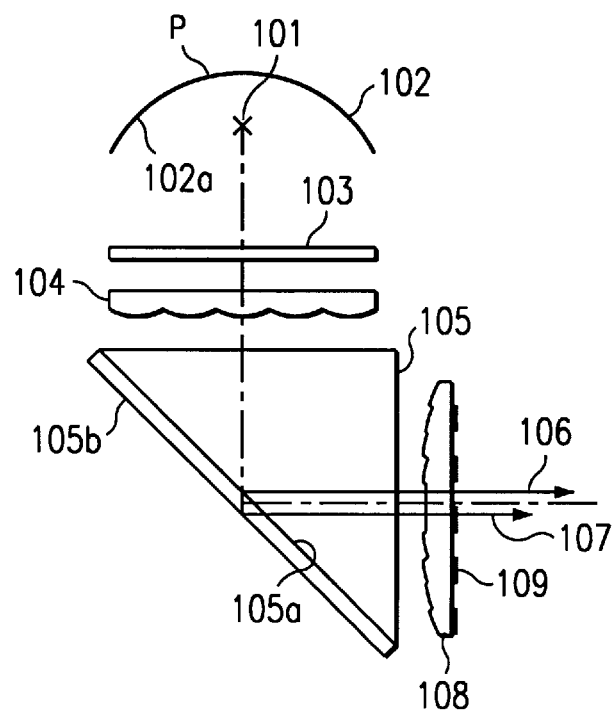
FIG. 11 is a diagram of an illuminating optical system used in a conventional projector.

FIG. 10 shows a fifth embodiment of a polarized beam splitter and other elements. A polarized beam splitter 650 is a splitter of a polarized light converting optical system which includes first and second right angle prisms 651a, 651b in the form of a triangular prism of transparent glass or the like, a polarized beam splitting surface 650a which is formed on the oblique rear surfaces of these right angle prisms 651a, 651b and a full reflection surface 650c which is spaced opposite to the polarized beam splitting surface 650a by thickness 650b.

This polarized beam splitter 650 is used in place of the polarized beam splitter 5 of FIG. 1. At this time, since a plane including an emergence surface B1 of the first right angle prism 651a crosses a boundary 4b, an image having an unfocused ridge C is not projected on the screen.

Although the polarized beam splitter 650 is constructed such that a plane including an incidence surface A2 of the second right angle prism 651b crosses the center of the second lens 8a, the plane may not cross the center of the second lens 8a as in FIG. 7.

As described above, it is not necessary to apply a coating to the polarized light converting optical system to improve reflectivity. Thus, the polarized light converting optical system can be easily produced at a reduced cost. Further, if the same material is used for the right angle prism 51 and the plane parallel plate 52, there is no difference in the thermal expansion coefficient between these members, with the result that the thermal deformation of the right angle prism 51coincides with that of the planar parallel plate 52. Accordingly, the polarized light splitting function is not degraded even under a high temperature condition. Therefore, the polarized light converting optical system is enabled to have a higher heat resistance and a degree of freedom in selecting a light source can be increased. Furthermore, there can be obtained a polarized light converting optical system having balanced dimensions and splitting performance of the polarized beam splitting surface.

Also, the projector can be made more lightweight and unnecessary images are not projected on the screen, ensuring high quality images on the screen.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. A projector comprising:
   a first lens array including a plurality of first lenses arranged two-dimensionally for separating light into a plurality of beams of light;

a polarized beam splitter for splitting a beam of light into a beam of first linearly polarized light components and a beam of second linearly polarized light components, polarization axes of the first and second linearly polarized light components being normal to each other, the polarized beam splitter including a prism having:
- an incidence surface perpendicularly intersecting an optic axis of the first lens array on which a beam of light is incident;
- a first splitting surface obliquely intersecting the optic axis of the first lens array, the first splitting surface reflecting the first linearly polarized light components;
- a transparent parallel plate attached on the first splitting surface, wherein the angle of incidence $\psi$ with respect to the parallel plate, the width W of the first lens, the height H of the first lens, the focal length F of the first lens, and the refractive index N of the prism satisfies the following equation:

$$\Psi - \sin^{-1}\left(\frac{\sin\left(\tan^{-1}\left(\frac{\sqrt{W^2+H^2}}{2F}\right)\right)}{N}\right) - \sin^{-1}\left(\frac{1}{N}\right) \geq 0$$

a second lens array including a plurality of second lenses arranged two-dimensionally in a vicinity of a position where the beams of the first and second linearly polarized light components converge; and a converter for converting one of the first and second linearly polarized light components so as to have the same axes of polarization as the other linearly polarized light components.

2. A projector as defined in claim 1, wherein the refractive index of the parallel plate is identical to that of the prism.

3. A projector as defined in claim 2, wherein the angle of incidence $\psi$ is substantially 45 degrees.

4. A projector as defined in claim 1, wherein the converter is disposed between the polarized beam splitter and the second lens array.

5. A projector as defined in claim 1, wherein the converter is disposed on an emergence side of the second lens array.

6. A projector comprising:

a first lens array including a plurality of first lenses arranged two-dimensionally for separating light into a plurality of beams of light;

a polarized beam splitter for splitting a beam of light into a beam of first linearly polarized light components and another beam of second linearly polarized light components, polarization axes of the first and second linearly polarized light components being normal to each other, the polarized beam splitter including a plurality of prisms whose respective splitting surfaces are on an oblique plane obliquely intersecting an optic axis of the first lens array, an emergence surface of at least one of the plurality of prisms being positionable on a plane passing a boundary between first lenses of the first lens array;

a second lens array including a plurality of second lenses arranged two-dimensionally in vicinity of a position where the beams of the first and second linearly polarized light components converge; and a converter for converting one of the first and second linearly polarized light components so as to have the same axes of polarization as the other linearly polarized light components.

7. A projector as defined in claim 6, wherein an incidence surface of at least one of the plurality of prisms is positionable on a plane passing a boundary between second lenses of the second lens array.

8. A projector as defined in claim 6, wherein the converter is disposed between the polarized beam splitter and the second lens array.

9. A projector as defined in claim 6, wherein the converter is disposed on an emergence side of the second lens array.

* * * * *